United States Patent
Choi et al.

(10) Patent No.: US 8,576,911 B2
(45) Date of Patent: Nov. 5, 2013

(54) METHOD AND APPARATUS FOR MOTION ESTIMATION

(75) Inventors: Yoon-hee Choi, Suwon-si (KR); Yeong-kyeong Seong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1290 days.

(21) Appl. No.: 12/034,021

(22) Filed: Feb. 20, 2008

(65) Prior Publication Data

US 2008/0316365 A1 Dec. 25, 2008

(30) Foreign Application Priority Data

Jun. 21, 2007 (KR) .................. 10-2007-0061121

(51) Int. Cl.
*H04B 1/66* (2006.01)
*H04B 14/04* (2006.01)

(52) U.S. Cl.
USPC ............ 375/240.16; 375/240.24; 375/240.12; 375/240.25; 375/240.26; 348/699; 348/19; 348/14; 382/254

(58) Field of Classification Search
USPC ............ 348/699, 19, 14; 375/240.16, 240.24, 375/240.12, 240.25, 240.26; 382/254
See application file for complete search history.

(56) References Cited

U.S. PATENT DOCUMENTS

| 5,541,640 A * | 7/1996 | Larson .................. 348/14.15 |
| 6,360,015 B1 * | 3/2002 | Bakhmutsky et al. ........ 382/236 |
| 7,010,041 B2 * | 3/2006 | Graziani et al. .......... 375/240.16 |
| 2003/0012281 A1 * | 1/2003 | Cho et al. ................ 375/240.16 |
| 2003/0123748 A1 * | 7/2003 | Sebot et al. .................. 382/254 |

FOREIGN PATENT DOCUMENTS

| JP | 11203192 A | 7/1999 |
| KR | 20030007087 A | 1/2003 |
| KR | 20050078153 A | 8/2005 |
| WO | 0225955 A1 | 3/2002 |
| WO | 2004045079 A2 | 5/2004 |

OTHER PUBLICATIONS

Communication dated Jun. 7, 2013 from the Korean Intellectual Property Office in counterpart application No. 10-2007-0061121.

* cited by examiner

*Primary Examiner* — Andrew Chriss
*Assistant Examiner* — Jamal Javaid
(74) *Attorney, Agent, or Firm* — Sughrue Mion, PLLC

(57) ABSTRACT

An efficient method of motion estimation is provided. The method includes receiving a plurality of macroblocks in a reference frame, wherein the plurality of macroblocks are used for motion estimation related to a current frame, and performing the motion estimation for a plurality of macroblocks in the current frame by using the received plurality of macroblocks in the reference frame.

18 Claims, 13 Drawing Sheets

METHOD AND APPARATUS FOR MOTION ESTIMATION

CROSS-REFERENCE TO RELATED PATENT APPLICATION

This application claims priority from Korean Patent Application No. 10-2007-0061121, filed on Jun. 21, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to motion estimation, and more particularly, to motion estimation performed by a processor having a limited memory.

2. Description of the Related Art

Due to development of information technology including the Internet, multimedia services using text, voice and image communication are increased. Multimedia data that is high-capacity data requires a high-capacity storage medium, and broad bandwidth for transmission thereof. Thus, in order to transmit data including text, images, and audio, a compressive coding technology is required.

A basic principle for coding data is to remove redundancy of data. Representative examples of video-coding technologies are inter-frame prediction and intra-frame prediction. The intra-frame prediction is a method of encoding an image, based on high correlation between adjacent pixels within one frame. The inter-frame prediction is a method of encoding an image, based on a similarity between consecutive frames of a video sequence.

In a moving image, as long as there is no rapid change, many parts of the image have few changes between consecutive frames. In particular, motion vector estimation used for inter-frame prediction is one of the representative technologies for encoding an image, wherein the motion vector estimation processes an image by differentially encoding the motion vectors calculated by motion estimation.

In general, a motion vector of a certain block has close correlation with a motion vector of an adjacent partition. Thus, the amount of data to be transmitted can be reduced by estimating the motion vector of a current block from the motion vector of the adjacent partition, and by encoding only a differential vector.

FIG. 1 is a diagram illustrating an example of motion estimation according to related art technology.

In the example of the motion estimation according to the conventional technology, the motion estimation for a macroblock 130 is performed by comparing the macroblock 130 in a current frame with a search range 120 in a reference frame 110.

In general, the search range 120 is a range in the reference frame 110, wherein the range is within a predetermined area defined by coordinates of the macroblock 130, on which the motion estimation is to be performed.

When the search range 120 in the reference frame 110 is transmitted to a memory in a processor, the processor compares the macroblock in the search range 120 with the macroblock 130 on which the motion estimation is to be performed, and performs the motion estimation. In such a case, the processor compares the macroblock 130 in the current frame with one macroblock in the search range 120. When the comparison ends, the processor compares the macroblock 130 with another macroblock located one pixel to the right, and thereby searches a macroblock in the search range 120, wherein the macroblock has the highest similarity to the macroblock 130 in the current frame.

In order to perform the motion estimation for a next macroblock 131, a new search range 121 in the reference frame 110 is transmitted to the memory in the processor. When the transmission ends, the processor performs the motion estimation for the next macroblock 131. However, in the aforementioned motion estimation, it is difficult to prevent transmitted data from being overlapped.

Since a parallel processor in a multi-core system only accesses a limited local memory and processes calculations, data transmission between a main memory and the local memory via Direct Memory Access (DMA) is necessary. For the efficient data transmission in the multi-core system, it is important to enable the DMA to be performed in the background during calculations by the parallel processor.

Accordingly, transmission of high-capacity data for performing small calculations can lower system efficiency. In particular, since video data is high-capacity data, the video data requires a huge amount of data transmission between the main memory and the local memory. As a result, an efficient usage of the data has an effect on a capability of processing the video data.

As mentioned above, since many ranges are transmitted while being mutually overlapped during data transmission, the motion estimation according to the conventional technology can greatly lower system efficiency. Thus, by more efficiently using data, and performing calculations, the time taken to perform motion estimation can be greatly reduced.

SUMMARY OF EXEMPLARY EMBODIMENTS OF THE INVENTION

Exemplary embodiments of the present invention provide a method and apparatus for motion estimation, wherein the method and apparatus prevent data from being redundantly transmitted and perform parallel processing of the data, thereby reducing the time taken to perform motion estimation.

According to an aspect of the present invention, there is provided a method of motion estimation including the operations of receiving a plurality of macroblocks in a reference frame, wherein the plurality of macroblocks are used for motion estimation related to a current frame; and performing the motion estimation for a plurality of macroblocks in the current frame by using the received plurality of macroblocks in the reference frame.

The received plurality of macroblocks in the reference frame may be macroblocks corresponding to a same horizontal line or a same vertical line in the reference frame.

The plurality of macroblocks in the current frame may be macroblocks corresponding to a same horizontal line or a same vertical line in the current frame.

The operation of performing the motion estimation may include the operations of calculating a similarity between the macroblock in the current frame and the received macroblocks in the reference frame, and searching for a macroblock having the highest similarity in the reference frame; comparing a similarity between the searched for macroblock and a macroblock having the highest similarity in a previously received reference frame; and updating information related to similarity of a macroblock in the reference frame, wherein the macroblock has the highest similarity to the macroblock in the current frame, based on a result of the comparison.

The similarity may be a Sum of Absolute Differences (SAD) value.

The information related to the macroblock having the highest similarity may be a motion vector based on the motion estimation.

According to another aspect of the present invention, there is provided a method of performing motion estimation by using a parallel processor, the method including the operations of loading a plurality of macroblocks in a reference frame into a storage space in the parallel processor, wherein the plurality of macroblocks are to be used for performing motion estimation related to a plurality of macroblocks in a current frame; and simultaneously performing calculation for the motion estimation related to the plurality of macroblocks in the current frame, by using the loaded plurality of macroblocks in the reference frame.

The calculation for the motion estimation may be calculation of a SAD value indicating a similarity between macroblocks.

The operation of performing the calculation of the SAD value may include the operations of calculating a difference between pixel values of the loaded plurality of macroblocks in the reference frame and pixel values of the plurality of macroblocks in the current frame; and calculating the SAD value of the respective plurality of macroblocks in the current frame, based on the calculated difference between pixel values.

According to another aspect of the present invention, there is provided a motion estimation apparatus including a reception unit receiving a plurality of macroblocks in a reference frame, wherein the plurality of macroblocks are used for motion estimation related to a current frame; and a motion estimation unit performing motion estimation for a plurality of macroblocks in the current frame by using the received plurality of macroblocks in the reference frame.

According to another aspect of the present invention, there is provided an apparatus for performing motion estimation by using a parallel processor, the apparatus including a storage unit to which a plurality of macroblocks in a reference frame are loaded, wherein the plurality of macroblocks are to be used for motion estimation related to a plurality of macroblocks in a current frame, and wherein the storage unit is in the parallel processor; and a calculation unit simultaneously performing a calculation for the motion estimation related to the plurality of macroblocks in the current frame, by using the loaded plurality of macroblocks in the reference frame.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
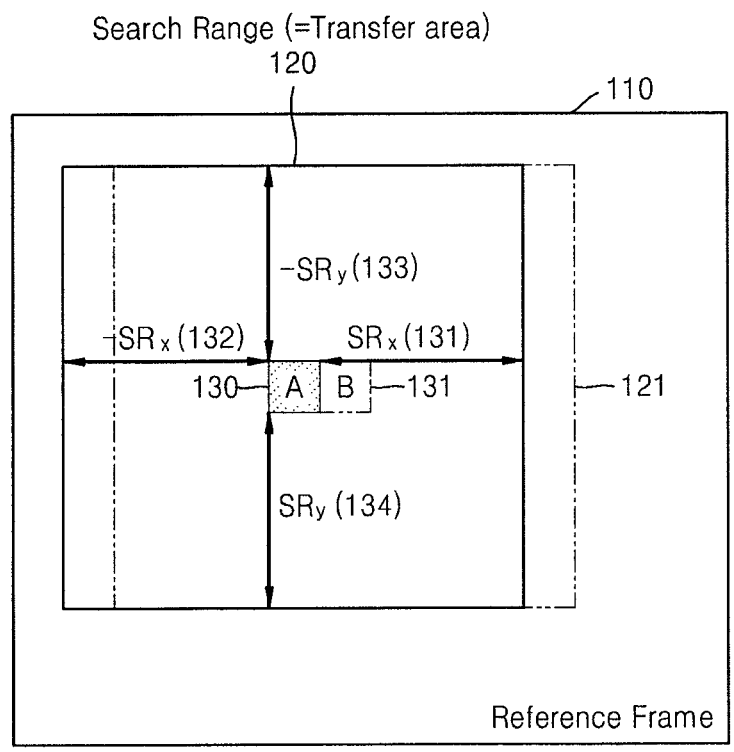
FIG. 1 is a diagram illustrating an example of motion estimation according to a related art technology.
Figure 2A:
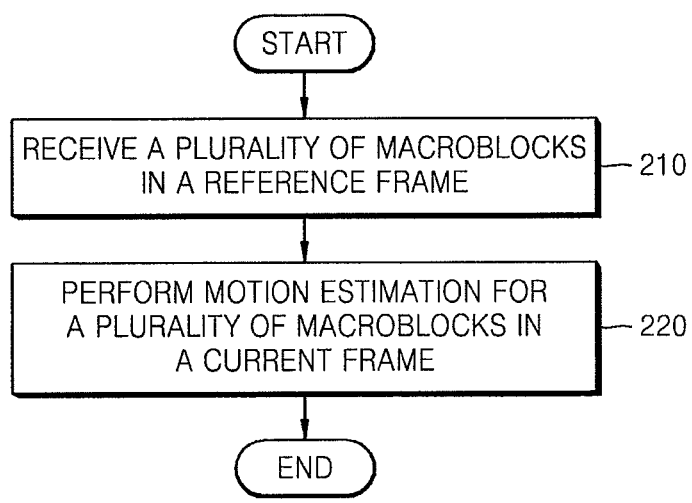
FIGS. 2A and 2B are flowcharts illustrating a method of motion estimation according to an exemplary embodiment of the present invention.

FIG. 2A is a flowchart illustrating a method of motion estimation according to an exemplary embodiment of the present invention.

In operation 210, a plurality of macroblocks in a reference frame are received, wherein the plurality of macroblocks are used for motion estimation related to a current frame. At this time, the received plurality of macroblocks in the reference frame may be macroblocks corresponding to the same horizontal line or the same vertical line in the reference frame.

Figure 2B:
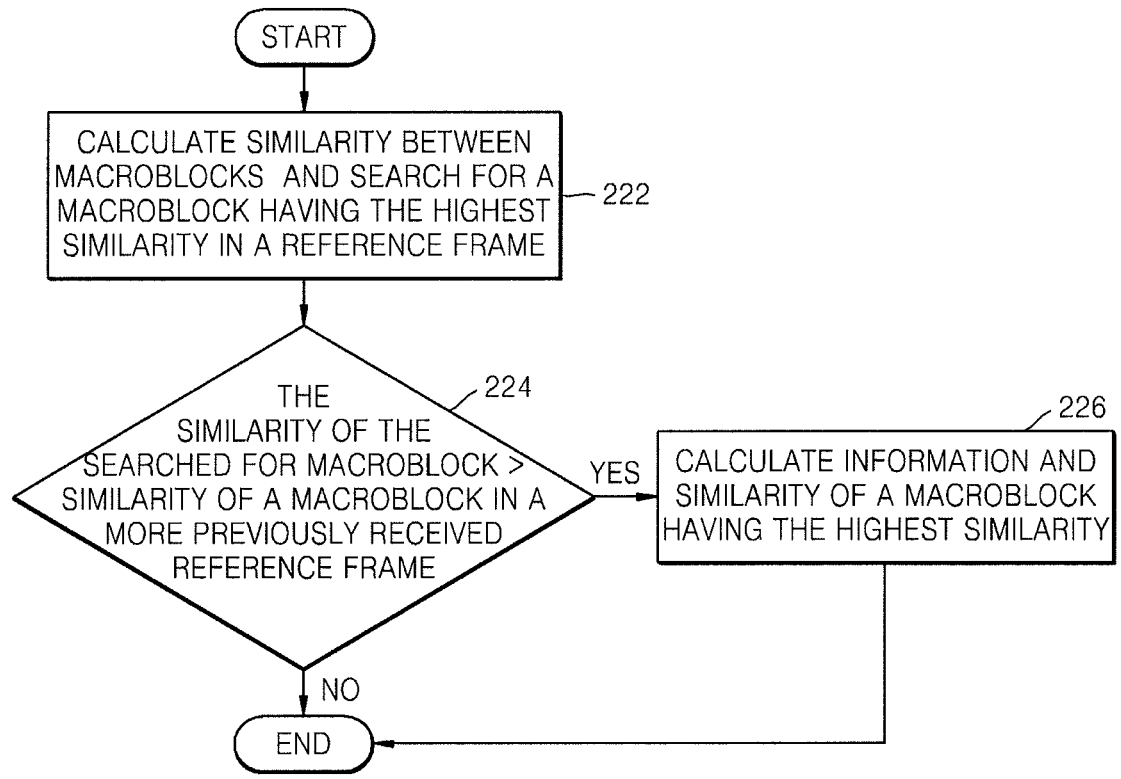

In operation 220, by using the plurality of macroblocks in the reference frame received in operation 210, the motion estimation for a plurality of macroblocks in the current frame is performed. The plurality of macroblocks in the current frame may be macroblocks corresponding to the same horizontal line or the same vertical line, wherein the motion estimation for the plurality of macroblocks is to be performed by using the reference frame received in operation 210, FIG. 2B is a flowchart illustrating in detail operation 220 of FIG. 2A.

In operation 222, a similarity between the macroblock in the current frame and the macroblocks in the reference frame received in operation 210 is calculated, and a macroblock having the highest similarity among the macroblocks in the reference frame is searched for. The similarity between macroblocks for the motion estimation may be determined based on an SAD. In this case, a macroblock having a smaller SAD value may be determined to be a macroblock that is more similar to a current macroblock.

The SAD value is obtained by calculating the difference between pixels of the macroblock in the current frame, wherein the motion estimation for the macroblock is to be performed, and the macroblock in the reference frame, by obtaining absolute values of the calculated difference between the pixels, and then adding the absolute values. Thus, when the macroblock in the current frame is similar to the macroblock in the reference frame, the difference between the pixels becomes smaller, so that the SAD value also becomes smaller.

In operation 224, a similarity between the macroblock in the reference frame searched for in operation 222, and a macroblock in a more previously received reference frame is compared, wherein the macroblock in the more previously received reference frame has the highest similarity to the current macroblock. Information related to a degree of similarity of the macroblock that is in the more previously received reference frame, having the highest similarity to the current macroblock, may be stored in a separate storage space. In such a case, in operation 224, the similarity transmitted from the separate storage space is compared with the similarity of the macroblock searched for in operation 222. Also, the information related to the macroblock may be position information related to the corresponding macroblock, and may be a motion vector.

In operation 226, based on a result of comparison in operation 224, when the similarity of the macroblock searched for in operation 222 is higher than the similarity of the macroblock in the more previously received reference frame, the information related to the degree of similarity of the macroblock having the highest similarity to the current macroblock, wherein the information related to the similarity are stored in the storage space, are changed to information related to a degree of similarity of the macroblock searched for in operation 222.

FIGS. 3A through 3E are diagrams illustrating motion estimation according to another exemplary embodiment of the present invention.

Figure 3A:
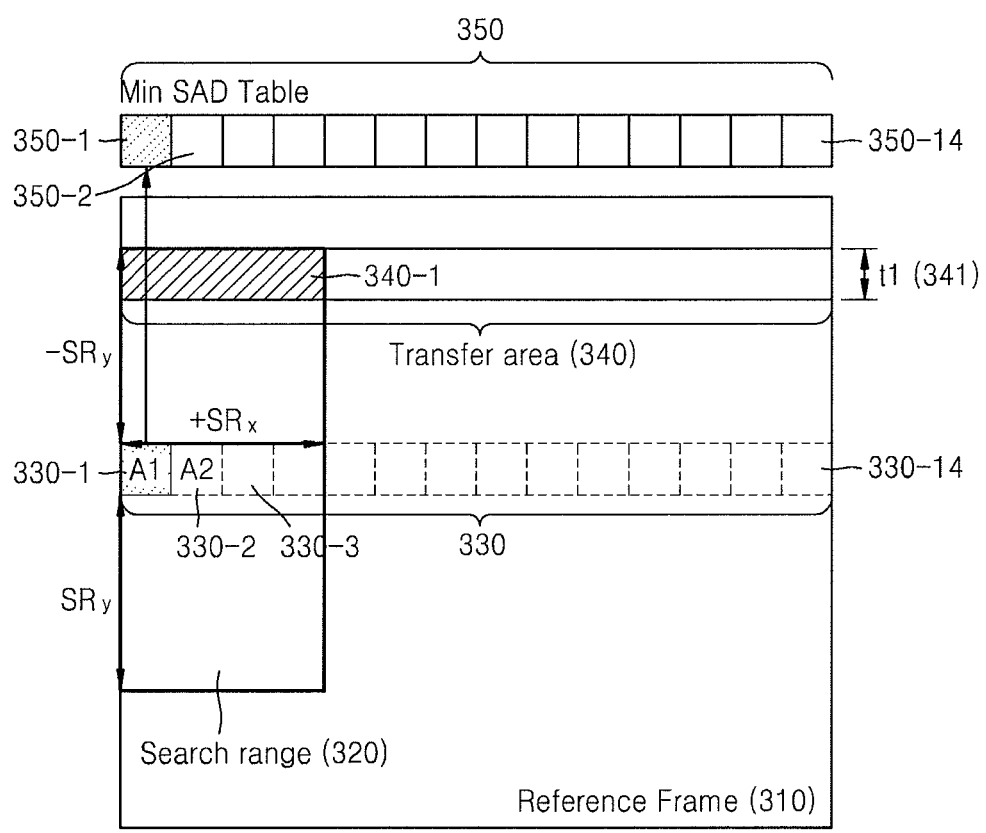
FIGS. 3A through 3E are diagrams illustrating motion estimation according to another exemplary embodiment of the present invention.

FIG. 3A is a diagram illustrating an example in which the motion estimation for an A1 macroblock 330-1 is performed by using data transmitted to a local memory, according to another exemplary embodiment of the present invention.

Referring to 3A, the motion estimation for a plurality of macroblocks 330 in a current frame is performed via calculations in relation to a macroblock in a reference frame 310. In order to perform the motion estimation, the macroblock in the reference frame 310 is required, wherein the macroblock is in a search range within a predetermined range defined by coordinate values of the current macroblock.

Data 340 corresponding to a predetermined horizontal line in the reference frame 310 is transmitted at one time to the local memory. In the current example, data in a horizontal line t1 341 in the reference frame 310 is transmitted at one time.

A motion vector indicating position of macroblock in the reference data transmitted to the local memory which is the most similar to the A1 macroblock 330-1 may be obtained by calculating a SAD value between A1 macroblock 330-1 and reference data 340-1 corresponding to a search range 320, wherein the reference data 340-1 is among the data 340 transmitted to the local memory. A purpose of a motion estimation process is to obtain a motion vector indicating a position of a macroblock which has a minimum SAD value. Thus, the minimum SAD value has to be searched in the entire search range 320. The SAD values are calculated using reference data 340-1 and then a macroblock which has a minimum SAD value is detected based on the SAD value. Motion vectors indicating the position of the macroblock which has a minimum SAD value with respect to A1 macroblock 330-1 and the calculated SAD value of the macroblock which has a minimum SAD value with respect to A1 macroblock 330-1, are stored in a table 350. A minimum SAD value between the A1 macroblock 330-1 and a macroblock in the reference data 340-1 is stored in a space 350-1 within the table 350, wherein the space 350-1 corresponds to the A1 macroblock 330-1.

Figure 3B:
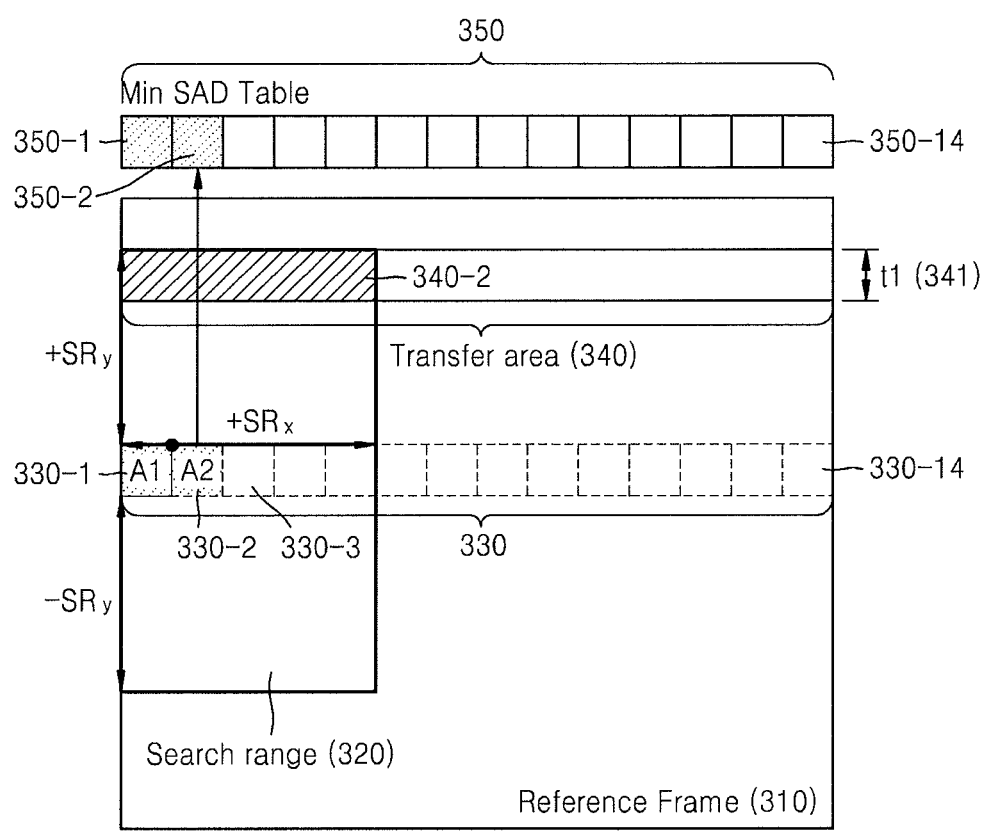

FIG. 3B is a diagram illustrating an example in which the motion estimation for an A2 macroblock 330-2 is performed by using the data 340 transmitted to the local memory, according to another exemplary embodiment of the present invention.

A motion vector indicating a position of a macroblock in the reference data 340-2 transmitted to the local memory that is the most similar to the A2 macroblock 330-2, may be obtained by calculating a SAD value between A2 macroblock 330-2 and reference data 340-2 corresponding to a search range 320, wherein the reference data 340-2 is among the data 340 transmitted to the local memory. The SAD values are calculated using reference data 340-2 and then the macroblock which has a minimum SAD value with respect to A2 macroblock 330-2 is detected based on the SAD value. Motion vectors indicating position of the macroblock which has a minimum SAD value with respect to A2 macroblock 330-2 and the calculated SAD value of the macroblock which has a minimum SAD value with respect to A2 macroblock 330-2, are stored in a table 350. A minimum SAD value between the A2 macroblock 330-2 and macroblock in the reference data 340-2 is stored in a space 350-2 within the table 350, wherein the space 350-2 corresponds to the A2 macroblock 330-2.

Figure 3C:
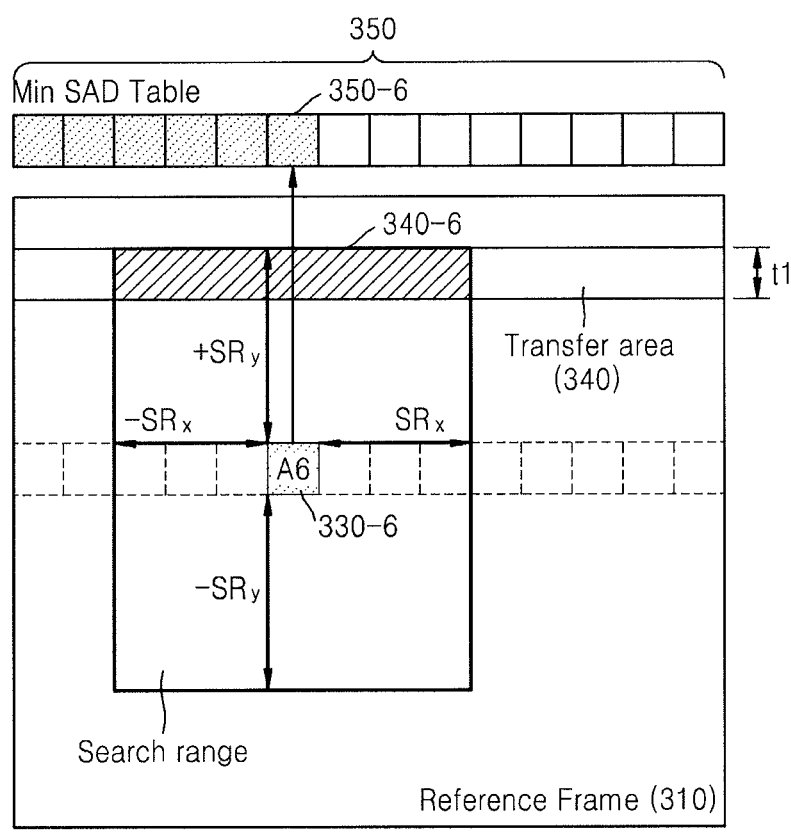

FIG. 3C is a diagram illustrating an example in which the motion estimation for an A6 macroblock 330-6 is performed by using the data 340 transmitted to the local memory, according to another exemplary embodiment of the present invention.

Referring to FIG. 3C, a motion vector indicating a position of the macroblock in the reference data 340-6 transmitted to the local memory that is most similar to the A6 macroblock 330-6, may be obtained by calculating a SAD value between A6 macroblock 330-6 and reference data 340-6 corresponding to a search range 320, wherein the reference data 340-6 is among the data 340 transmitted to the local memory. The SAD values are calculated using reference data 340-6 and then the macroblock which has a minimum SAD value with respect to A6 macroblock 330-6 is detected based on the SAD value between A6 macroblock 330-6 and macroblocks in the reference data 340-6. Motion vectors indicating a position of the macroblock which has a minimum SAD value with respect to A6 macroblock 330-6 and the calculated SAD value of the macroblock which has a minimum SAD value with respect to A6 macroblock 330-6, are stored in a table 350. A minimum SAD value between the A6 macroblock 330-6 and the macroblock in the reference data 340-6 is stored in a space 350-6 within the table 350, wherein the space 350-6 corresponds to the A6 macroblock 330-6.

Figure 3D:
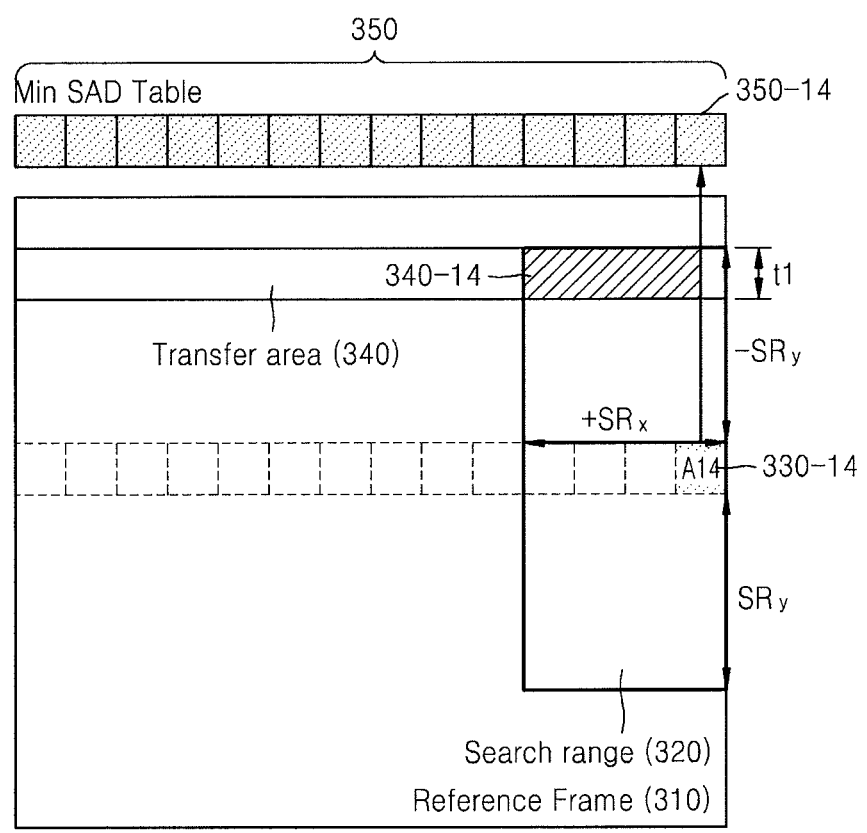

FIG. 3D is a diagram illustrating an example in which the motion estimation for an A14 macroblock 330-14 is performed by using the data 340 transmitted to the local memory, according to another exemplary embodiment of the present invention.

Referring to FIG. 3D, a motion vector indicating the position of the macroblock in the reference data 340-14 transmitted to the local memory that is the most similar to the A14 macroblock 330-14, may be obtained by calculating a SAD value between A14 macroblock 330-14 and reference data 340-14 corresponding to a search range 320, wherein the reference data 340-14 is among the data 340 transmitted to the local memory. The SAD values are calculated using reference data 340-14 and then the macroblock which has a minimum SAD value with respect to A14 macroblock 330-14 is detected based on the SAD value between A14 macroblock 330-14 and macroblocks in the reference data 340-14. Motion vectors indicating the position of the macroblock which has a minimum SAD value with respect to A14 macroblock 330-14 and the calculated SAD value of the macroblock which has a minimum SAD value with respect to A14 macroblock 330-14, are stored in a table 350. A minimum SAD value between the A14 macroblock 330-14 and the macroblock in the reference data 340-14, is stored in a space 350-14 within the table 350, wherein the space 350-14 corresponds to the A14 macroblock 330-14.

The A14 macroblock 330-14 is the last macroblock in the predetermined horizontal line, and in this manner, the motion estimation for the entire predetermined horizontal line is performed by using the transmitted data 340.

Figure 3E:
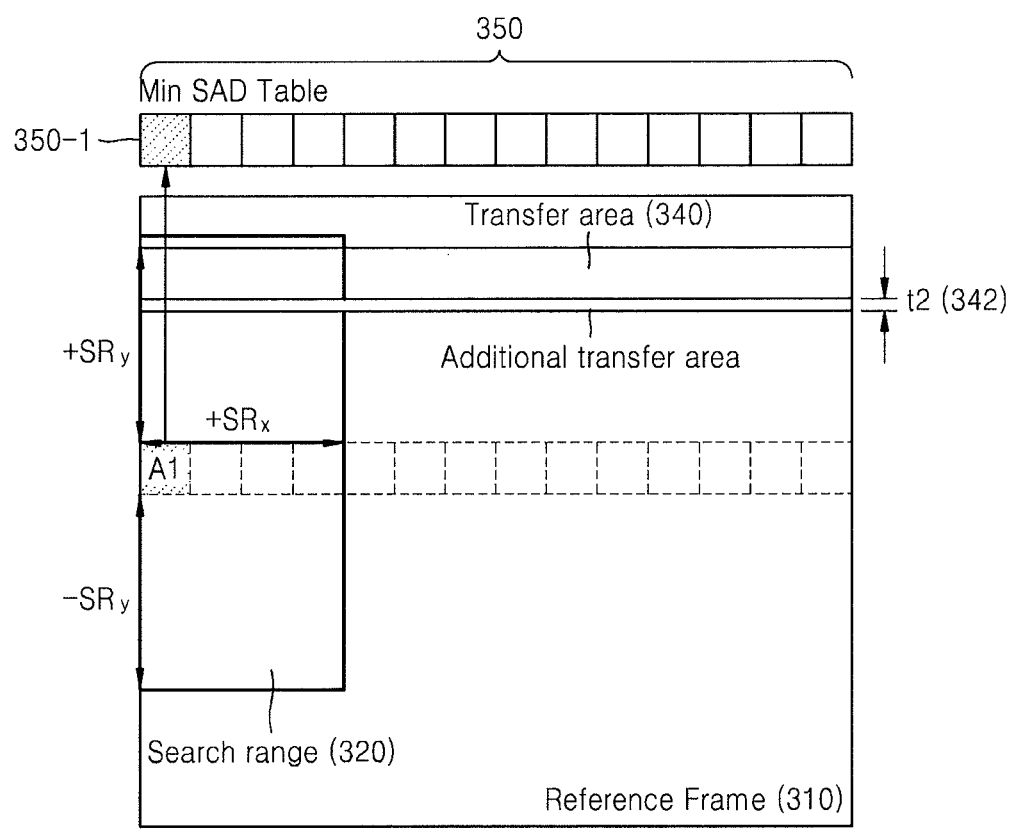

FIG. 3E is a diagram illustrating an example in which new data is transmitted to the local memory, whereby the motion estimation is performed, according to another exemplary embodiment of the present invention.

The amount of data to be newly transmitted may differ according to a processor's capability. In the current example, data in a horizontal line t2 342 is transmitted.

By using newly transmitted data 340-1, as described in FIGS. 3A through 3D, the motion estimation for a macroblocks in a current frame is performed. When a macroblock having a minimum SAD value between the macroblock in a current frame and a macroblock in the newly transmitted data 340-1, is searched for, this SAD value is compared with the minimum SAD value stored in the table 350, thereby determining whether to update the table 350.

All of the aforementioned procedures are repeated for all horizontal lines in the reference frame, thereby obtaining a motion estimation value of macroblocks corresponding to a predetermined horizontal line in the current frame. In this manner, Direct Memory Access (DMA) transmission is performed once for the motion estimation related to all macroblocks included in each horizontal line, thereby greatly reducing overheads occurring during DMA transmission, in comparison with a conventional method.

Figure 4:
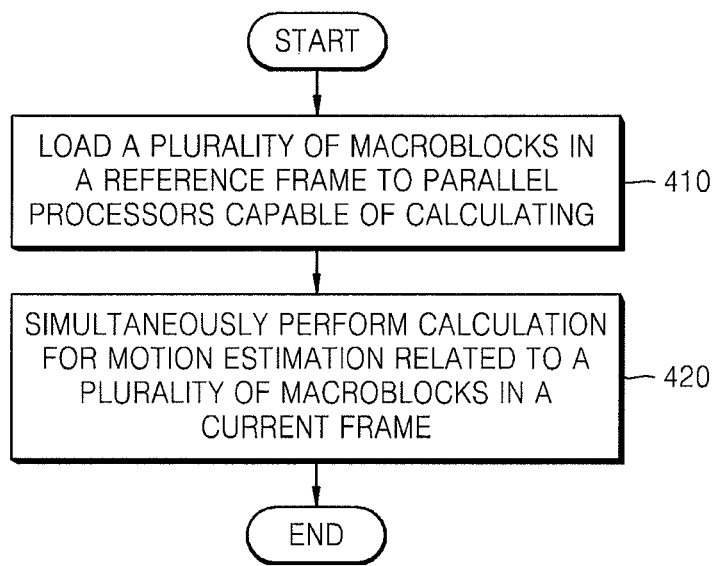
FIG. 4 is a flowchart illustrating a method of simultaneously performing motion estimation for a plurality of macroblocks according to another exemplary embodiment of the present invention.

FIG. 4 is a flowchart illustrating a method of simultaneously performing motion estimation for a plurality of macroblocks according to another exemplary embodiment of the present invention.

In operation 410, in order to perform the motion estimation for the plurality of macroblocks in a current frame, a plurality of macroblocks in a reference frame are loaded in a storage space in a parallel processor. The storage space may be a register in the parallel processor, wherein the register is for performing motion calculation.

In operation 420, by using the plurality of macroblocks in the reference frame loaded in operation 410, the calculation for the motion estimation related to the plurality of macroblocks in the current frame is simultaneously performed. In such a case, the calculation for the motion estimation may be a calculation related to a SAD value indicating a similarity between the loaded plurality of macroblocks in the reference frame and the plurality of macroblocks in the current frame.

The calculation related to the SAD value calculates the difference between pixel values of the loaded plurality of macroblocks in the reference frame and pixel values of the plurality of macroblocks in the current frame. Then, the SAD value is calculated based on the difference between the calculated pixel values. At this time, the motion estimation for the plurality of macroblocks is simultaneously performed by using a plurality of parallel processors.

Figure 5A:
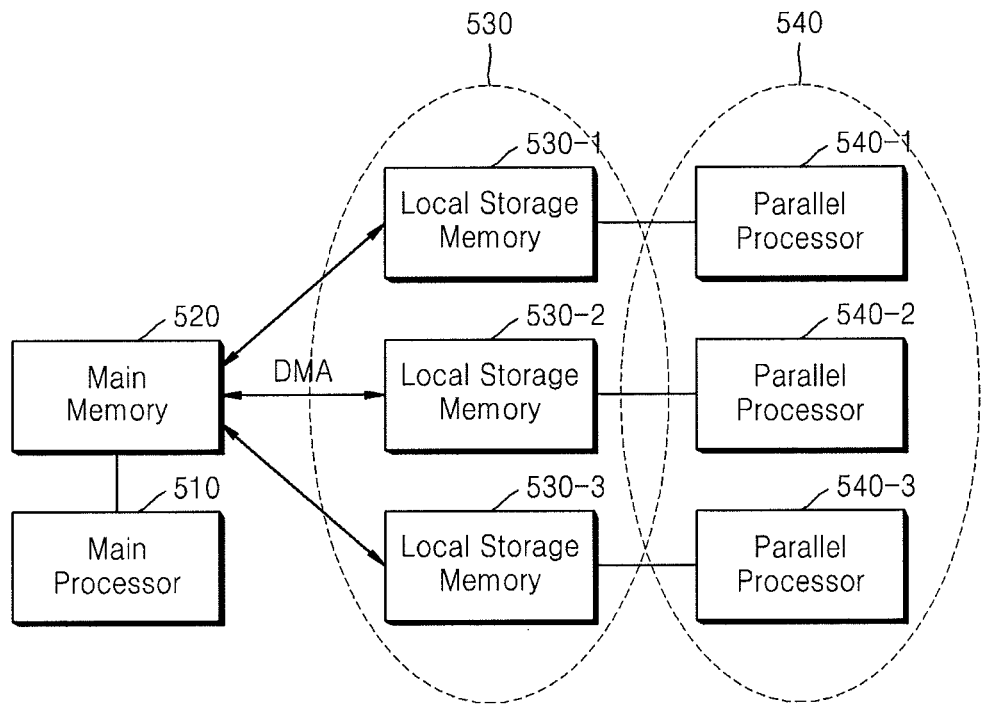
FIGS. 5A through 5C are diagrams illustrating a multi-core system for simultaneously performing motion estimation for a plurality of macroblocks according to another exemplary embodiment of the present invention.
Figure 5B:
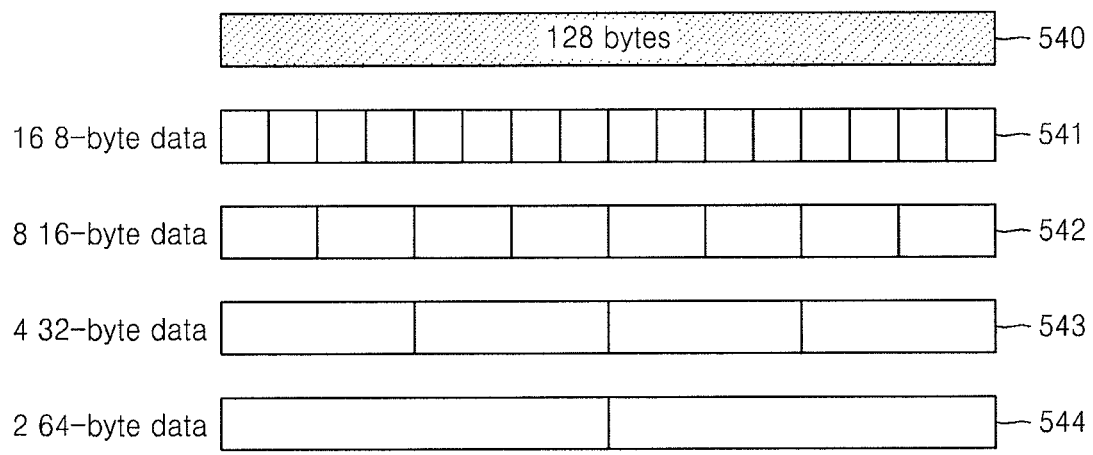
Figure 5C:
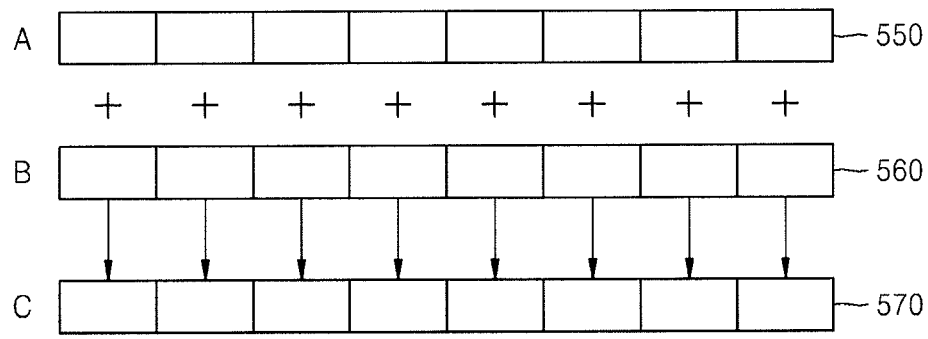

FIGS. 5A through 5C are diagrams illustrating a multi-core system for simultaneously performing motion estimation for a plurality of macroblocks according to another exemplary embodiment of the present invention.

FIG. 5A is a block diagram illustrating the multi-core system.

The multi-core system includes a main processor 510, a main memory 520, a local memory 530, and parallel processors 540.

The main processor 510 is mainly used for an operating system, and can access the main memory 520.

The main memory 520 stores data required to operate the main processor 510.

The local memory 530 stores data so as to operate the parallel processor 540. The local memory 530 receives data from the main memory 520, and transmission of the data is performed by DMA.

The parallel processors 540 are mainly used to perform processing calculations and process data by accessing the local memory 530.

In the multi-core system, data of the main memory 520 is transmitted to a plurality of local memories 530 in a plurality of parallel processors 540 via the DMA. Also, results processed by the plurality of parallel processors 540 are transmitted to the main memory 520 via the DMA. The parallel processors 540 cannot access the main memory 520, and can only access the local memory 530.

In this manner, the multi-core system decentralizes calculations that have been processed by one processor, to a plurality of cores, thereby increasing efficiency. Thus, efficiency for motion estimation may be increased by decentralizing calculations required for the motion estimation to the plurality of cores.

The multi-core system may perform Single Instruction Multiple Data (SIMD) calculation by which a plurality of data is processed with a single calculation.

FIG. 5B is a diagram illustrating a register structure for the SIMD calculation, according to another exemplary embodiment of the present invention.

A SIMD register 540, having a size of 128 bytes, processes 16 pieces of 8-byte data 541, or 8 pieces of 16-byte data 542 at a time. Also, the SIMD register 540 may process 2 pieces of 64-byte data 544 at a time.

FIG. 5C is a diagram illustrating an example in which the SIMD calculation is performed for 8 pieces of 16 byte data, according to another exemplary embodiment of the present invention.

Addition calculation related to data stored in a first register 550 and data stored in a second register 560 is performed. The addition is performed 8 times by single addition calculation, and results thereof are stored in a third register 570. In this manner, since a plurality of data is processed at one time by single addition calculations, processing speed is faster than a case in which data is processed one by one.

Figure 6:
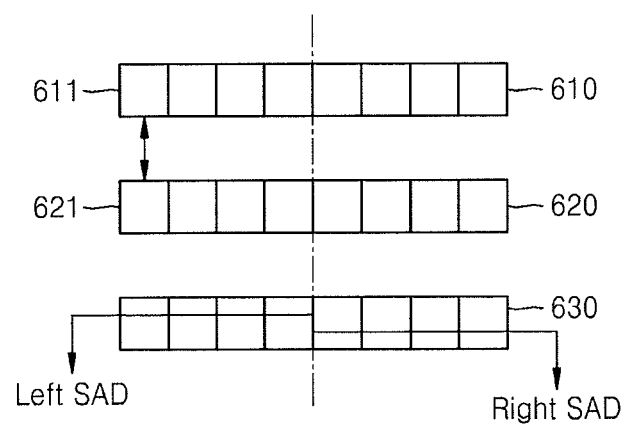
FIG. 6 is a diagram illustrating motion estimation by using Single Instruction Multiple Data (SIMD) calculation according to another exemplary embodiment of the present invention.

FIG. 6 is a diagram illustrating motion estimation by using SIMD calculation according to another exemplary embodiment of the present invention.

Referring to FIG. 6, a size of a macroblock is 4×4. According to an exemplary embodiment of the present invention, it is possible to simultaneously perform calculation of a SAD value related to two macroblocks respectively having a size of 4×4. In the case where the block size is 2×2, the calculation of the SAD value may be simultaneously performed for 4 pieces of macroblocks. In FIG. 6, only a horizontal line located at the top of the macroblock having the size of 4×4 is illustrated, and according to a capability of a SIMD structure, the calculation of the SAD value may be performed at one time for all horizontal lines.

A plurality of macroblocks in a current frame are loaded in a register 610, wherein the motion estimation is performed on the plurality of macroblocks.

A plurality of macroblocks in a reference frame are loaded in a register 620, wherein the plurality of macroblocks are to be used for the motion estimation.

In the case of motion estimation by using a SAD value, the difference between pixel values is calculated. According to exemplary embodiments of the present invention, in order to only perform a minus calculation, when a pixel value of the first register 610 is smaller than a pixel value of the second register 620, the position of a corresponding pixel may be changed. That is, when a pixel 611 located at the end of the left side in the first register 610 is smaller than a pixel 621 located at the end of the left side in the second register 620, positions of the pixels 611 and 621 are switched. When loading of the macroblocks is completed, the second register 620 is subtracted from the first register 610. This illustrates the difference between pixel values in the second register 620, wherein the pixel values respectively correspond to pixel values in the first register 610.

When the calculation ends, the calculated pixel values may be stored in a third register 630. The pixel values stored in the third register 630 are results obtained from the calculation for the motion estimation related to the plurality of macroblocks in the current frame. Thus, based on the pixel values stored in the third register 630, SAD values for the respective macroblocks in the current frame have to be obtained.

In the current embodiment, a SAD value for one macroblock is obtained by adding the sum of four pixels located to the left in the third register 630. Also, a SAD value for another macroblock is obtained by adding the sum of four pixels located to the right in the third register 630.

Figure 7A:
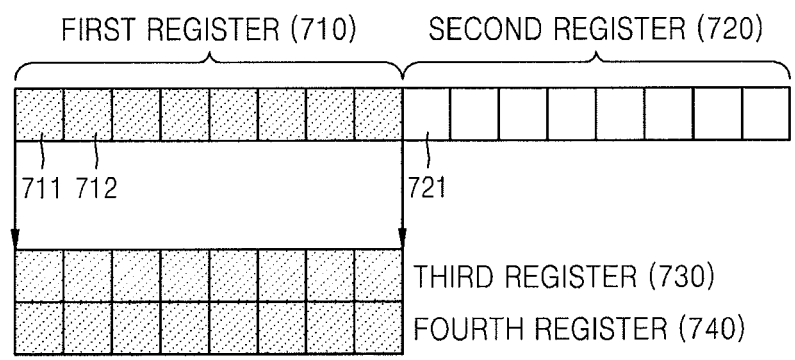
FIGS. 7A through 7B are diagrams illustrating a method of loading macroblocks in a reference frame when motion estimation is performed by using parallel SIMD calculation according to another exemplary embodiment of the present invention.
Figure 7B:
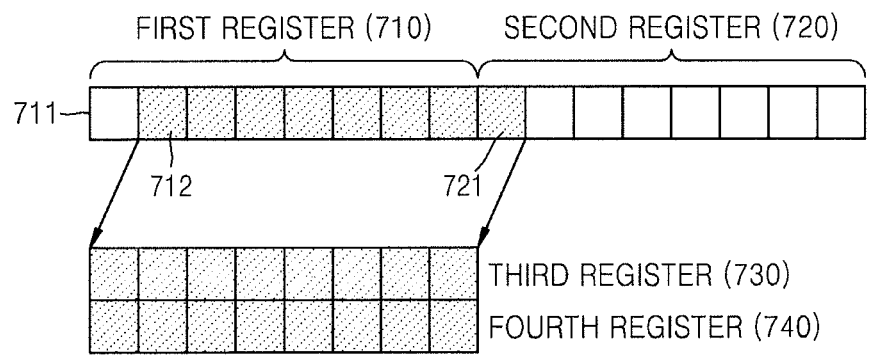

FIGS. 7A through 7B are diagrams illustrating a method of loading macroblocks in a reference frame when motion estimation is performed by using parallel SIMD calculation according to another exemplary embodiment of the present invention.

Referring to FIGS. 7A through 7B, a parallel processor according to an exemplary embodiment of the present invention includes a first register 710 and second register 720 in which a plurality of macroblocks in a reference frame are to be loaded, a third register 730 which is to be used for performing calculation, and a fourth register 740 in which a plurality of macroblocks in a current frame are to be loaded.

Referring to FIG. 7A, the plurality of macroblocks in the reference frame are loaded in the first register 710 and second register 720, wherein the plurality of macroblocks are to be used for motion estimation.

From among the plurality of macroblocks loaded to the first register 710 and second register 720, a macroblock required for actual calculation is loaded in the third register 730.

Firstly, 8 pieces of pixel values in the first register 710 are loaded in the third register 730.

The plurality of macroblocks in the current frame are loaded in the fourth register 740, wherein motion estimation is to be performed for the plurality of macroblocks.

When all of the macroblocks are loaded in the third register 730 and fourth register 740, calculation for the motion estimation is performed, as described with reference to FIG. 6.

Referring to FIG. 7B, when the motion estimation ends, the rest of the pixels excluding a pixel 711 located at the very left in the first register 710, and a pixel 721 located at the very left in the second register 720 are loaded in the third register 730. That is, the calculation required for motion estimation is performed by using macroblocks next to a pixel in the reference frame.

When the corresponding macroblocks are loaded in the third register 730, the calculation for the motion estimation is performed using the fourth register 740. The calculation is repeatedly performed by loading part of the data in the first register 710 and second register 720 into the third register 730. When the calculation has been performed 8 times, the entire data in the first register 710 has been used, and therefore, new macroblocks are loaded from the reference frame. At this time, the macroblocks loaded in the second register 720 may be moved to the first register 710, and then the new macroblocks may be loaded in the second register 720.

The aforementioned procedure is repeated for all search ranges in the reference frame, wherein the search ranges are required for the motion estimation related to the macroblocks in the current frame loaded in the fourth register 740. In such a case, a method of transmitting the macroblocks in the reference frame to a memory in a parallel processor may be performed by transmitting the macroblocks in the reference frame to all required search ranges. However, it is obvious that a DMA method described in relation to FIG. 2 according to an exemplary embodiment of the present invention is more efficient.

Figure 8:
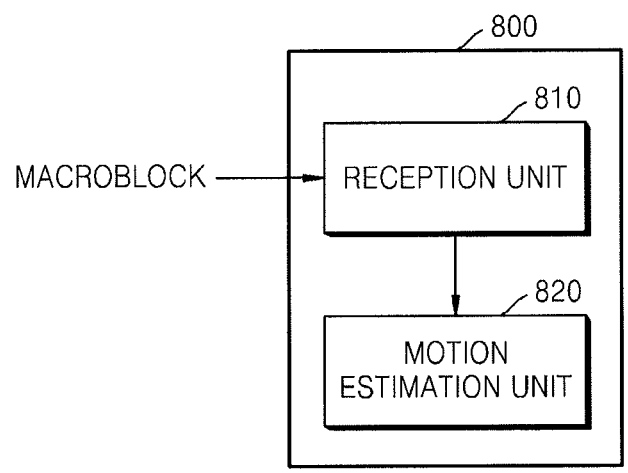
FIG. 8 is a block diagram illustrating a motion estimation apparatus according to another exemplary embodiment of the present invention.

FIG. 8 is a block diagram illustrating a motion estimation apparatus 800 according to another exemplary embodiment of the present invention.

The motion estimation apparatus 800 according to an exemplary embodiment of the present embodiment includes a reception unit 810, and a motion estimation unit 820.

The reception unit 810 receives a plurality of macroblocks in a reference frame, wherein the plurality of macroblocks are to be used for motion estimation in a current frame. The received plurality of macroblocks may be macroblocks corresponding to the same horizontal line or the same vertical line. The reception unit 810 may simultaneously receive a plurality of macroblocks in the current frame, wherein the motion estimation is to be performed for the plurality of macroblocks. The reception unit 810 may be a local memory in a parallel processor.

The motion estimation unit 820 performs the motion estimation for the plurality of macroblocks in the current frame, by using the plurality of macroblocks in the reference frame received by the reception unit 810. The plurality of macroblocks in the current frame may be macroblocks corresponding to the same horizontal line or the same vertical line.

The motion estimation may be performed by determining a similarity between the plurality of macroblocks in the reference frame received by the reception unit 810 and the plurality of macroblocks in the current frame. The similarity may be a SAD value.

Description related to the motion estimation unit 820 will be explained in detail below with reference to FIG. 9.

Figure 9:
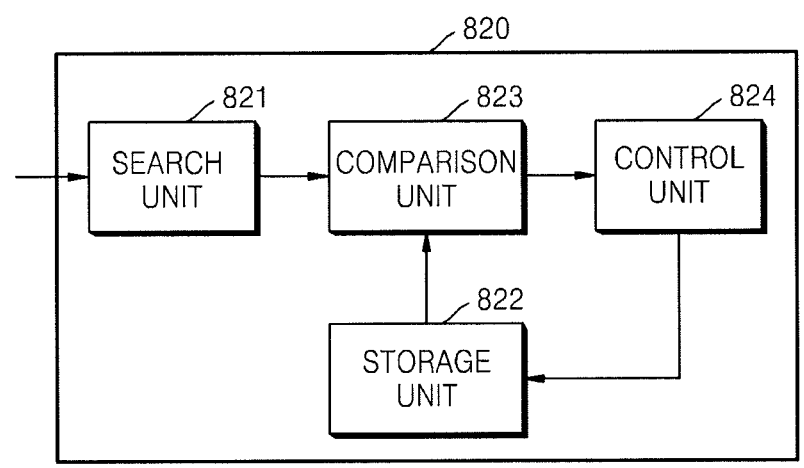
FIG. 9 is a block diagram illustrating a detailed configuration of the motion estimation unit illustrated in FIG. 8, according to another exemplary embodiment of the present invention.

FIG. 9 is a block diagram illustrating a detailed configuration of the motion estimation unit 820 illustrated in FIG. 8, according to another exemplary embodiment of the present invention.

The configuration of the motion estimation unit 820 illustrated in FIG. 8 includes a search unit 821, a storage unit 822, a comparison unit 823, and a control unit 824.

The search unit 821 calculates the similarity between the plurality of macroblocks in the reference frame received by the reception unit 810 and a macroblock in the current frame. According to a result of calculation, a macroblock having the highest similarity to the macroblocks in the current frame is searched for, wherein the macroblock having the highest similarity is among the plurality of macroblocks in the reference frame received by the reception unit 810.

The storage unit 822 stores information related to a similarity value of a macroblock having the highest similarity in a reference frame more previously received by the reception unit 810. The information may be a value of a motion estimation vector.

The comparison unit 823 receives information related to the similarity of the searched for macroblock, from the search unit 821. Also, the comparison unit 823 receives the information related to the similarity of the macroblock having the highest similarity to the current macroblock from the storage unit 822, wherein the macroblock having the highest similarity is among the macroblocks in the more previously received reference frame. The comparison unit 823 compares the similarities of the macroblocks respectively received from the search unit 821 and the storage unit 822.

The control unit 824 is input the comparison result from the comparison unit 823, and updates the information related to the similarity of the macroblock having the highest similarity to the current macroblock, wherein the macroblock is in the reference frame, and the information related to the similarity are stored in the storage unit 822. For example, when the similarity input from the search unit 821 to the comparison unit 823 is higher than the similarity input from the storage unit 822 to the comparison unit 823, then the similarity and the information related to the macroblock having the similarity input from the search unit 821 are stored in the storage unit 822, thereby updating the information related to the similarity.

Figure 10:
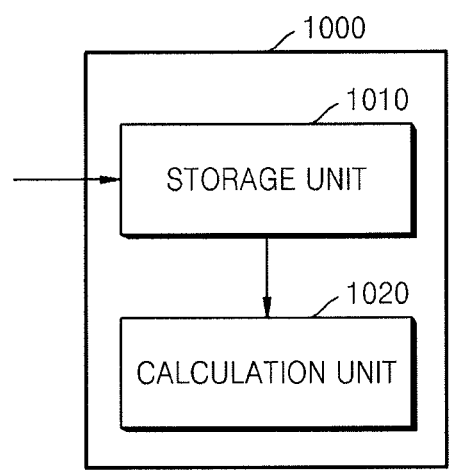
FIG. 10 is a block diagram illustrating a motion estimation apparatus simultaneously performing motion estimation for a plurality of macroblocks according to another exemplary embodiment of the present invention.

FIG. 10 is a block diagram illustrating a motion estimation apparatus 1000 simultaneously performing motion estimation for a plurality of macroblocks according to another embodiment of the present invention.

The motion estimation apparatus 1000 includes a storage unit 1010, and a calculation unit 1020.

A plurality of macroblocks in a reference frame, wherein the plurality of macroblocks are to be used in the motion estimation for a plurality of macroblocks in a current frame, are loaded in the storage unit 1010. The storage unit 1010 may be a storage space in a parallel processor capable of performing simultaneous calculations. For example, the storage unit 1010 may be a register in the parallel processor.

The calculation unit 1020 simultaneously performs calculations for the motion estimation related to the plurality of macroblocks in the current frame, by using the plurality of macroblocks in the reference frame loaded in the storage unit 1010. The calculation for the motion estimation performed by the calculation unit 1020 may be a calculation of a SAD value indicating a similarity between macroblocks.

Exemplary embodiments of the present invention can reduce overlapped transmission of data, and perform motion estimation, thereby greatly increasing efficiency of a system having a limited memory space.

Also, exemplary embodiments of the present invention can simultaneously perform motion estimation for a plurality of macroblocks via a parallel processor, thereby reducing time for processing the motion estimation. By doing so, time required for processing a video codec, definition improvement, object tracking, and the like can be reduced.

The exemplary embodiments of the present invention can be written as computer programs and can be implemented in general-use digital computers that execute the programs using a computer readable recording medium.

Examples of the computer readable recording medium include magnetic storage media (e.g., ROM, floppy disks, hard disks, etc.), and optical recording media (e.g., CD-ROMs, or DVDs). Other types of transmission media can include carrier waves (e.g., transmission through the Internet).

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of motion estimation, the method comprising:
   receiving a first plurality of macroblocks in a reference frame at one time, wherein the first plurality of macroblocks are to be used for motion estimation related to a current frame; and
   performing the motion estimation for a second plurality of macroblocks in the current frame by using the received first plurality of macroblocks in the reference frame,
   wherein any additional portion of the reference frame is received only after a time when the first plurality of macroblocks in the reference frame are used for movement estimation for the second plurality of macroblocks,
   wherein the performing of the motion estimation comprises:
   calculating a first similarity between a first macroblock in the current frame and the received first plurality of macroblocks in the reference frame, and searching for a second macroblock having a first highest similarity to the first macroblock, in the first plurality of macroblocks;
   comparing a second similarity between the second macroblock and the first macroblock with a third similarity between a third macroblock having a second highest similarity in a previously received reference frame and the first macroblock; and
   selectively updating information related to a fourth similarity of a macroblock in the reference frame having a third highest similarity to the first macroblock, to information related to the second similarity of the second macroblock based on a result of the comparing,
   wherein the information related to the fourth similarity of the macroblock having a third highest similarity is information on the third macroblock.

2. The method of claim 1, wherein the received first plurality of macroblocks in the reference frame are macroblocks corresponding to one of a same horizontal line and a same vertical line in the reference frame.

3. The method of claim 1, wherein the second plurality of macroblocks in the current frame are macroblocks corresponding to one of a same horizontal line and a same vertical line in the current frame.

4. The method of claim 1, wherein at least one from among the similarities is determined based on a Sum of Absolute Differences (SAD) value.

5. The method of claim 1, wherein the information related to the fourth similarity of the macroblock having the third highest similarity to the first macroblock, is a motion vector based on the motion estimation.

6. A method of performing motion estimation by using a parallel processor, the method comprising:
   loading a first plurality of macroblocks in a reference frame into a storage space in the parallel processor at one time, wherein the first plurality of macroblocks are to be used for performing motion estimation related to a second plurality of macroblocks in a current frame; and
   performing calculation for the motion estimation related to the second plurality of macroblocks in the current frame, by using the loaded first plurality of macroblocks in the reference frame,
   wherein any additional portion of the reference frame is received only after a time when the first plurality of macroblocks in the reference frame are used for movement estimation for the second plurality of macroblocks,
wherein the performing of the calculation comprises:
calculating a first similarity between a first macroblock in the current frame and the loaded first plurality of macroblocks in the reference frame, and searching for a second macroblock having a first highest similarity to the first macroblock, in the first plurality of macroblocks;
comparing a second similarity between the second macroblock and the first macroblock with a third similarity between a third macroblock having a second highest similarity in a previously received reference frame and the first macroblock; and
selectively updating information related to a fourth similarity of a macroblock in the reference frame having a third highest similarity to the first macroblock, to information related to the second similarity of the second macroblock based on a result of the comparing,
wherein the information related to the fourth similarity of the macroblock having a third highest similarity is information on the third macroblock.

7. The method of claim 6, wherein the calculation for the motion estimation is calculation of a Sum of Absolute Differences (SAD) value indicating a similarity between macroblocks.

8. The method of claim 7, wherein the performing of the calculation of the SAD value comprises:
calculating a difference between pixel values of the loaded first plurality of macroblocks in the reference frame and pixel values of the second plurality of macroblocks in the current frame; and
calculating the SAD value of the respective second plurality of macroblocks in the current frame, based on the calculated difference between pixel values.

9. A motion estimation apparatus comprising:
a reception unit which receives a first plurality of macroblocks in a reference frame at one time, wherein the first plurality of macroblocks are to be used for motion estimation related to a current frame; and
a motion estimation unit which performs motion estimation for a second plurality of macroblocks in the current frame by using the received first plurality of macroblocks in the reference frame,
wherein any additional portion of the reference frame is received only after a time when the first plurality of macroblocks in the reference frame are used for movement estimation for the second plurality of macroblocks, and
wherein the motion estimation unit comprises:
a search unit which calculates a first similarity between a first macroblock in the current frame and the received first plurality of macroblocks in the reference frame, and searching for a second macroblock having a first highest similarity to the first macroblock, in the first plurality of macroblocks;
a storage unit which stores information related to a second similarity of a third macroblock having a second highest similarity in a previously received reference frame;
a comparison unit which compares the first highest similarity between the second macroblock and the first macroblock with a third similarity of the third macroblock and the first macroblock based on a calculated similarity and stored information related to the second similarity of the third macroblock; and
a control unit controlling which selectively updates the stored information related to the second similarity of the third macroblock in the storage unit to information related to a fourth similarity of the second macroblock, based on a result of the comparison.

10. The motion estimation apparatus of claim 9, wherein the first plurality of macroblocks in the reference frame received by the reception unit are macroblocks corresponding to one of a same horizontal line and a same vertical line in the reference frame.

11. The motion estimation apparatus of claim 9, wherein the second plurality of macroblocks in the current frame are macroblocks corresponding to one of a same horizontal line and a same vertical line in the current frame.

12. The motion estimation apparatus of claim 9 wherein at least one from among the similarities is determined based on a Sum of Absolute Differences (SAD) value.

13. The motion estimation apparatus of claim 9, wherein the reception unit comprises a memory in a parallel processor.

14. An apparatus for performing motion estimation by using a parallel processor, the apparatus comprising:
a storage unit to which a first plurality of macroblocks in a reference frame are loaded at one time, wherein the first plurality of macroblocks are to be used for motion estimation related to a second plurality of macroblocks in a current frame, and wherein the storage unit is in the parallel processor; and
a calculation unit which performs a calculation for the motion estimation related to the second plurality of macroblocks in the current frame, by using the loaded first plurality of macroblocks in the reference frame,
wherein the calculation unit performs the calculation for the motion estimation such that loading any additional portion of the reference frame only occurs after a time when the first plurality of macroblocks in the reference frame are used for movement estimation for the second plurality of macroblocks, and
wherein the calculation unit comprises:
a search unit which calculates a first similarity between a first macroblock in the current frame and the loaded first plurality of macroblocks in the reference frame, and searching for a second macroblock having a first highest similarity to the first macroblock, in the first plurality of macroblocks;
a storage unit which stores information related to a second similarity of a third macroblock having a second highest similarity in a previously received reference frame;
a comparison unit which compares the first highest similarity between the second macroblock and the first macroblock with a third similarity of the third macroblock and the first macroblock based on a calculated similarity and stored information related to the second similarity of the third macroblock; and
a control unit controlling which selectively updates the stored information related to the second similarity of the third macroblock in the storage unit to information related to a fourth similarity of the second macroblock, based on a result of the comparison.

15. The apparatus of claim 14, wherein the calculation for the motion estimation is a calculation for a Sum of Absolute Differences (SAD) value indicating a similarity between macroblocks.

16. The apparatus of claim 15, wherein the calculation unit calculates a difference between pixel values of the loaded first plurality of macroblocks in the reference frame and the second plurality of macroblocks in the current frame; and calculates the SAD value of the respective second plurality of macroblocks in the current frame, based on the calculated difference between pixel values.

17. The apparatus of claim 14, wherein the storage unit comprises a register in the parallel processor.

18. A non-transitory computer readable recording medium having recorded thereon a method of motion estimation, the method comprising:

receiving a first plurality of macroblocks in a reference frame at one time, wherein the first plurality of macroblocks are to be used for motion estimation related to a current frame; and performing the motion estimation for a second plurality of macroblocks in the current frame by using the received first plurality of macroblocks in the reference frame, wherein any additional portion of the reference frame is received only after a time when the first plurality of macroblocks in the reference frame are used for movement estimation for the second plurality of macroblocks, wherein the performing of the motion estimation comprises:

calculating a first similarity between a first macroblock in the current frame and the received first plurality of macroblocks in the reference frame, and searching for a second macroblock having a first highest similarity to the first macroblock, in the first plurality of macroblocks;

comparing a second similarity between the second macroblock and the first macroblock with a third similarity between a third macroblock having a second highest similarity in a previously received reference frame and the first macroblock; and selectively updating information related to a fourth similarity of a macroblock in the reference frame having a third highest similarity to the first macroblock, to information related to the second similarity of the second macroblock based on a result of the comparing, wherein the information related to the fourth similarity of the macroblock having a third highest similarity is information on the third macroblock.

* * * * *